United States Patent

Gau et al.

[11] Patent Number: 5,367,030
[45] Date of Patent: Nov. 22, 1994

[54] PROCESS FOR CROSSLINKING THERMOPLASTIC SILANE POLYMERS

[75] Inventors: Yimsan Gau; Michael J. Keogh; James R. Leech, all of Somerset; Hugh E. McGee, Somerville, all of N.J.

[73] Assignee: Union Carbide Chemicals & Plastics Technology Corporation, Danbury, Conn.

[21] Appl. No.: 196,893

[22] Filed: Feb. 14, 1994

Related U.S. Application Data

[63] Continuation of Ser. No. 14,705, Feb. 8, 1993, abandoned.

[51] Int. Cl.$^5$ ............................................. C08F 30/08
[52] U.S. Cl. ................................. 525/326.5; 525/386; 524/588
[58] Field of Search .................. 525/326.5, 386; 524/588

[56] References Cited

U.S. PATENT DOCUMENTS 4,680,319 7/1987 Gimpel et al. .................... 525/288
5,047,476 9/1991 Keogh .................................. 525/106

Primary Examiner—John C. Bleutge
Assistant Examiner—Mark D. Sweet
Attorney, Agent, or Firm—B. L. Deppenbrock

[57] ABSTRACT

A process for crosslinking a thermoplastic ethylene silane copolymer which comprises forming the ethylene silane copolymer in a thermoforming operation into a shaped article and thereafter subjecting the thermoplastic ethylene silane copolymer shaped article to a solution of benzoic acid in an mount and for a time sufficient to crosslink the thermoplastic ethylene silane copolymer.

12 Claims, No Drawings

PROCESS FOR CROSSLINKING THERMOPLASTIC SILANE POLYMERS

This application is a continuation of prior U.S. application Ser. No. 08/014,705 filed Feb. 8, 1993, now abandoned.

FIELD OF THE INVENTION

The present invention relates to a process for crosslinking thermoplastic olefin silane copolymers and more particularly to a process for crosslinking pipe or cable containing thermoplastic olefin silane copolymers.

BACKGROUND OF THE INVENTION

There are a variety of ways to achieve the crosslinking of polyolefins such as polyethylene. The most common way is through the use of peroxide crosslinking agents added to the resin. The peroxides provide a source of free radicals when heated above their decomposition temperatures. These free radicals are capable of extracting a hydrogen from the polyolefin backbone thus transferring the free radical site to the polyolefin. With this accomplished, two polyolefin chains can crosslink together. When this is carried out through the matrix of the resin, the molecules become tied together with covalent bonds and a crosslinked network is formed.

Peroxide crosslinking provides molded articles with excellent high temperature properties, but care must be taken during the thermoforming process. For example, extrusion temperatures must be kept quite low. If extrusion temperatures are above the peroxide decomposition temperatures, premature crosslinking (scorch) may occur. This temperature restriction limits the rates at which peroxide curable polyolefin can be extruded.

A second method of crosslinking polyolefin is through the use of irradiation. In this case, the free radical formed on the polyolefin backbone is the result of electron beam irradiation. This technique overcomes the extrusion restriction for the peroxide crosslinked systems noted above, but has restrictions of its own. Specifically, thick sections of insulation become difficult to cure uniformly and products with non uniform cross sections pose a challenging engineering problem. In addition, high energy irradiation equipment is expensive and a significant amount of safety shielding is required.

In the above two methods of crosslinking, carbon-carbon bonds are formed at the crosslink sites. This is in comparison to the siloxane bonds which form in the third type of crosslinking—moisture cure.

Moisture cure involves the crosslinking of silane modified polyolefins. The technique is dependent on modifying the polyolefins backbone with a silyl trialkoxy moiety, preferably where the alkoxy is methoxy or ethoxy. The modified polyolefin will only crosslink in the presence of water. In practice, the resin has catalyst incorporated in it to speed up the crosslinking reaction. By excluding moisture, high temperature extrusions are possible and the material can still be processed as a thermoplastic. This allows for high line rates. After the extrusion, a separate curing step is conducted by placing the extruded system into a water bath or sauna. Usually the water bath is at an elevated temperature (70°-95° C.).

There are three routes for producing the silane modified polyolefin, all of them involving the same vinyl trialkoxysilane (VTAS), but they differ in the time sequence, the complexity and the procedure for adding the silane. In one such procedure, the silane is incorporated during the reaction with an olefin to make a polyolefin addition copolymer. The resin goes directly from a reactor to the fabricator's extruder without any grafting in compounding equipment. This ensures a high degree of cleanliness and excellent control of the density and molecular weight distribution of the product. The chemical structure of the produced compound insures that the product will have at least a two year shelf stability. In order to crosslink the silane copolymer most effectively, a catalyst such as a tin catalyst is required. This is usually supplied in the form of a catalyst masterbatch prepared in a separate compounding step. For optimum performance, the catalyst masterbatch must be dried prior to use.

In a second procedure for the production of modified polyolefin, peroxide-grafting of VTAS to polyolefin is accomplished. To accomplish this, a peroxide is mixed with the silane and the polyolefin and all these components are compounded at high temperatures. During this compounding step, grafting of the VTAS occurs. In addition, some peroxide crosslinking occurs. Producers of these "Sioplas" type products must start the compounding with a polyolefin which has a melt index of about 10. After the compounding, the grafted product has a melt index of the order of one. The drop is due to the partial crosslinking (undesirable) of the peroxide acting on the polyolefin. These products have the potential disadvantages of the presence of unreacted silane and peroxide and of difficulty in controlling the grafting step, yielding a variable final melt index. Furthermore, the specific chemical structure of the graft copolymer yields a product which only has about a six month shelf stability. Similar to the thermoplastic olefin silane copolymer produced by the first technique, the fabricator of "Sioplas" resins would blend the resin with a dried catalyst masterbatch in the extruder, process the system as a thermoplastic and cure the product off-line in a water bath.

The third route for producing the silane modified polyolefin is through what is commonly called the Monosil/BICC process (see for example U.S. Pat. No. 4,117,195). In this case, a polyolefin, normally a polyethylene, a vinyl silane, a tin catalyst and a peroxide are all mixed together in an extruder/reactor at the fabricator's plant. The extruder utilizes a long extruder screw with a L/D of about 30:1. This enables the components to be mixed and reacted (grafted) during the extrusion process. As in the case with the Sioplas technology, a significant drop in melt index occurs. Great care is needed to achieve the grafting without excessive crosslinking and some unreacted silane and peroxide may pass through the system and remain in the resin. The specialized extruders are more expensive than general purpose polyethylene extruders used for thermoplastic olefin silane copolymers.

A feature common to all these processes is that in the fabrication step the silane modified resin is being processed in the presence of the silanol condensation catalyst, generally a tin catalyst. Under this condition premature crosslinking, scorch, through condensation of silane moieties may occur thereby leading to changes in melt viscosity and extrusion instability. In those cases when scorch becomes severe the process must be terminated and the equipment cleaned to removed scorched polymer before beginning again. This results in high scarp production and costly equipment outage adding to the overall cost and complexity of operation.

The present invention obviates these problems by allowing the fabrication process to occur in the absence of the condensation catalyst but permitting rapid and essentially complete crosslinking through application of the invention disclosed herein.

The present invention is primarily directed to an improvement in the crosslinking process for thermoplastic olefin silane copolymers.

It is noted that in the conventional process, the following sequences are evident.

1. The olefin silane copolymers are in contact with a catalyst such as a tin catalyst in an extruder, where unfortunately scorching can take place;

2. Catalyst masterbatch is prepared in a separate compounding step and drying before use is generally required;

3. The curing step is conducted by placing the extruded article in a steam or water bath at high temperatures.

In order to promote curing or achieve a faster curing rate and control of scorch, a carboxylic acid, such as acetic, formic, propionic, butyoic, benzoic and like acids can be compounded with the olefin silane copolymer of step 1 (see for example U.S. Pat. No. 5,047,476 issued Sep. 10, 1991 assigned to a common assignee and U.S. Pat. No. 4,680,319 issued to Gimpel).

DISCLOSURE OF THE INVENTION

An object of the invention, therefore, is to provide a process for crosslinking a thermoplastic olefin silane copolymer which eliminates scorch.

A further object is to provide a process for crosslinking a thermoplastic olefin silane copolymer with reduced process steps and wherein a catalyst such as a tin catalyst is not required.

A still further object is to produce a process for crosslinking a thermoplastic olefin silane copolymer at faster production rates and at higher molding temperatures if required.

These and other objects will become apparent from the following description of the invention.

SUMMARY OF THE INVENTION

Broadly contemplated, the present invention provides a process for crosslinking a thermoplastic olefin-silane copolymer which comprises forming a thermoplastic silane copolymer in a thermoforming operation, such as an extrusion or molding operation into a shaped article and thereafter subjecting said thermoplastic olefin-silane copolymer shaped article to a solution, preferably a saturated solution, of benzoic acid in an amount and for a time sufficient to crosslink said thermoplastic olefin silane copolymer.

DETAILED DESCRIPTION OF THE INVENTION

The term "copolymer" as used in this specification can include silane grafted olefin homopolymers and copolymers, and copolymers of one or more olefin monomers and an olefin silane monomer. The monomers on which the homopolymers and copolymers are based can be alpha-olefins or diolefins having 2 to 20 carbon atoms, particularly the lower alpha-olefins having 2 to 12 carbon atoms. Preferably, a major proportion, i.e., more than 50 percent by weight, of each copolymer is attributed to ethylene, propylene, or 1-butene. The silane monomer, which is either grafted or copolymerized, is unsaturated and has at least one hydrolyzable group.

In addition to the alpha-olefin, diolefin, and silane monomers, the balance of the copolymer can be based on one or more various olefin monomers having 2 to 20 carbon atoms. Examples of useful monomers are the vinyl esters, alkyl methacrylates, and alkyl acrylates. Examples of these compounds are 1-hexene, 4-methyl-1pentene, 1-undecene, ethylene acrylate, vinyl acetate, methyl methacrylate, 1,4-hexadiene, ethylidenenorbomene, dicyclopentadiene, methyl, ethyl or butyl acrylate.

In this copolymer, the portion attributed to the silane is present in an amount of about 0.1 percent to about 10 percent by weight based on the weight of the copolymer and is preferably incorporated into the copolymer in an amount of about 0.5 to about 4 percent by weight. The silane used to modify the copolymer can be, among others, a vinyl trialkoxy silane such as vinyl trimethoxy silane, vinyl triethoxy silane, or vinyl triisopropoxy silane. Generally speaking, any unsaturated monomeric organosilane having one or more hydrolyzable groups can be used.

A copolymer of ethylene and silane can be prepared by the process described in U.S. Pat. No. 3,225, 018 issued on Dec. 21, 1965 or U.S. Pat. No. 4,574, 133 issued on Mar. 4, 1986. The portion of the copolymer attributed to the silane is in the range of about 0.5 to about 10 percent by weight based on the weight of the copolymer and is preferably in the range of about 0.5 to about 4 percent by weight.

Processes for preparing silane grafted copolymers and numerous unsaturated silanes suitable for use in preparing these polymers and bearing hydrolyzable groups such as alkoxy, oxy aryl, oxyaliphatic, and halogen are mentioned in U.S. Pat. Nos. 3,075,948; 4,412,042; 4,413,066; and 4,593,071.

The produced silane grafted or addition copolymers which are thermoplastic ethylene silane copolymers are then introduced into a processing zone for molding operations such as rotational molding, compressed molding, injection molding or extrusion apparatus to form the desired shaped thermoplastic article.

The processing zone can be a conventional extruder, e.g., a single screw type. A typical extruder has a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and two zones, the back heat zone and the front heat zone, the sections and zones running from upstream to downstream. If it has more than one barrel, the barrels are connected in series. The length to diameter ratio of each barrel is in the range of about 16:1 to about 30:1.

The resident time of the mixture in the processing zone is, for example, of sufficient length to complete all or part of the extrusion or injection molding. This time is in the range of about 20 to about 2000 seconds and is preferably about 60 to about 1000 seconds.

Conventional additives can be added to the mixture introduced into the processing zone. The amount of additive is usually in the range of about 0.01 to about 50 percent based on the weight of the resin. Useful additives are antioxidants, ultraviolet absorbers, such as carbon black, antistatic agents, pigments, dyes, fillers, slip agents, fire retardants, such as mineral fillers, plasticizers, processing aids, lubricants, stabilizers, and smoke inhibitors. Blends of the hydrolyzable polymer and other polymers can be prepared in the processing zone provided that the resins to be blended with the hydrolyzable copolymer will not crosslink. Examples of these resins are low density polyethylene, high density polyethylene, polypropylene, linear low density polyethylene, and very low density polyethylene (with a density equal to or less than 0.915 grams per cubic centimeter).

The thermoplastic olefin silane copolymer exiting the processing zone is then available for crosslinking. Crosslinking can be effected by subjecting the shaped article to a solution of benzoic acid in an amount and for a time sufficient to effect crosslinking.

The benzoic acid can be employed as an aqueous solution of about 0.2% to about 3% by weight based on the weight of the solution. The amount to be employed depends on the temperature of the solution which can range from about 20° C. to about 95° C. It is preferred to employ the benzoic acid solution in the range of about 2.5% to about 2.8% by weight preferably about 2.7% by weight at preferred temperatures of about 75° C. to about 85° C.

The thermoplastic shaped ethylene-silane copolymer can be contacted with the benzoic acid solution in a variety of ways. In one technique, the shaped article is finally submerged in a solution of the benzoic acid. In another technique, the thermoplastic shaped ethylene silane copolymer can be sprayed with the solution of benzoic acid. In still another technique, the solution of benzoic acid is circulated through the article such as a pipe or liner. The appropriate technique would of course depend upon the type of article.

The amount of time required to fully crosslink would range from about ½ hour to about 12 hours depending on the concentration and temperature of the benzoic acid solution and the type of articles to be crosslinked.

The following examples will illustrate the present invention.

An ethylene silane copolymer was prepared by the technique described in U.S. Pat. No. 3,225,018. The copolymer had a melt index of 1.5 g/10 min. and a density of 0.923 g/cc. The copolymer was an addition copolymer of ethylene and vinyltrimethoxysilane. The copolymer is available from Union Carbide Chemicals and Plastics Company Inc under the tradename designation DFDA 5451. The copolymer was produced in pelletized form and plaques were formed by compression molding at a temperature of 135° C. To simulate the extrusion process some of the pellets were first melted in a Brabender mixer at a melt temperature of 180° C. before molding into plaques of 50 mils thickness. Another set of samples (control) were molded directly from the pellets. The control and processed samples were then exposed to a solution of benzoic acid maintained at 80° C. at the concentrations indicated in Table I. The processed samples were also exposed to water at 80° C. The gel levels in the samples were analyzed by decalin extraction at 0, ½, 2, 3 and 12 hour exposure time. The results are indicated in Table I. Torque rheometer data was also generated to ensure that the gel was not created during the extraction process itself. The rheometer test procedure is described in U.S. Pat. No. 4,108,582 issued on Apr. 19, 1977. The rheometer reading is in pound-inches (lb-in). The results are indicated in Table II.

TABLE I

| Examples | 0 | ½ | 1 | 2 | 3 | 12 |
|---|---|---|---|---|---|---|
| | Exposure Time in 1% Benzoic Acid Solution at 80° C., Hour | | | | | |
| (1) DFDA 5451 molded from pellet, % gel | 0.8 | 43.7 | 46.0 | 54.8 | 59.0 | 75.1 |
| (2) DFDA 5451 molded after Brabender, % gel | 1.0 | 60.3 | 64.7 | 66.6 | 69.2 | 77.9 |
| | Exposure Time in Water at 80° C., Hour | | | | | |
| (3) DFDA 5451 molded after Brabender, % gel | 0.0 | 0.0 | 0.0 | 0.0 | 0.0 | 0.2 |

TABLE II

| | Exposure Time in Saturated Benzoic Acid Solution at 80° C., Hour | | | |
|---|---|---|---|---|
| Examples | 0 | ½ | 2 | 12 |
| (4) DFDA 5451 molded after Brabender, | | | | |
| Torque lb-in | | 11 | 15 | 28 |
| % Gel | 0.0 | 2.5 | 50.0 | 62.0 |

The following Examples 5-8 demonstrate the unique effectiveness of the present invention when compared to another aryl carboxylic acid. Although it has been found that arylcarboxylic acids other than benzoic acid can be employed to effect crosslinking, acceptable crosslinking however can be only accomplished at much higher concentrations which present handling and operating problems. In these examples, the same type ethylene silane copolymer and processing conditions as employed in Example I was utilized.

The results are indicated in Table III

TABLE III

| | Exposure Time in Crosslinking Solution at 80° C., Hour | | |
|---|---|---|---|
| Examples | 30 Min | 2 Hrs | 12 Hrs. |
| (5) 5% Acetic Acid, % gel | 0 | 0 | 0.62 |
| (6) 20% Acetic Acid, % gel | 0 | 0 | 49 |
| (7) Concentrated Acetic Acid*, % gel | 33 | 56 | 76 |
| (8) 1% Benzoic Acid, % gel | 0.8 | 55-67 | 75-78 |

*Not practical due to handling problem.

As can be seen from the foregoing examples 1-4, after two hours of exposure to a saturated solution of benzoic acid the level of gel easily reaches 50 to 60%. Benzoic acid has been known to help promote crosslinking in silane copolymers containing a catalyst masterbatch when it is included in the formulation. This finding shows that it is also quite effective in crosslinking systems containing 100% ethylene silane copolymers when they are exposed to a solution of benzoic acid. Under the conventional procedure, catalyst, usually a tin catalyst, is required to be added to ethylene silane copolymers for their cure. In the present invention, no added catalyst is needed in addition to the benzoic acid to crosslink ethylene silane copolymers. A control experiment was also performed by exposing the plaques of DFDA 5451 in plain water. In plain water at 80° C., straight DFDA 5451 did not crosslink. In all cases the level of gel was less than 1%.

The concept of the present invention can be utilized for a wide variety of purposes particularly for the cross linking of pipe liners and wire and cable coatings.

As is known, in the current conventional relining process, thermoplastic polyethylene liners are first collapsed or folded into various shapes such as "U, S, H, Star" shapes to reduce its cross sectional area. The deformed liner is next pulled through the decayed pipe to be rehabilitated. Following the insertion of the liner, it is re-expanded against the pipeline to its circular shape by heat and pressure. The heating medium can be steam or water. In more demanding applications, thermoplastic polyethylene is replaced by crosslinked polyethylene. A similar installation procedure as described above is also applicable for crosslinked liners. The crosslinked liners offer many advantages including improved elevated temperature properties, ESCR, chemical resistance and memory. Because they can not be fused together, their lengths need to perfectly match that of the pipeline to be rehabilitated.

In the present invention, this disadvantage is eliminated. The deformed polyethylene liner stays thermoplastic up to the inflation process. Moreover the ready to be crosslinked liner can be butt fused to the desired length as needed.

The composition of the polyethylene liner is 100% ethylene silane copolymers. The liner is fabricated by extruding the resin through an annular die. The amount of crosslinking that can occur in the extruder is negligible since no catalyst is used. Furthermore, no special control of the processing temperatures or residence time in the extruder is required. Once the collapsed liner is made and pulled through the pipeline to be rehabilitated, crosslinking is achieved by mixing benzoic acid according to the teachings of the present invention with hot water used to re-inflate the deformed liner back to its circular shape. The temperatures of the hot water may range from 50° to 90° C. The pressure of the hot water may range from 5 to 20 psi.

What is claimed is:

1. A process for crosslinking a thermoplastic ethylene silane copolymer which comprises forming said ethylene silane copolymer in a processing zone into a shaped article in the absence of a catalyst, removing said shaped article from said processing zone and thereafter subjecting said thermoplastic ethylene silane copolymer shaped article to a solution of benzoic acid in an amount and for a time sufficient to crosslink said thermoplastic ethylene silane copolymer.

2. The process defined in claim 1 wherein the copolymer contains one or more alpha-olefin comonomers and one or more alkenyl alkoxy silane comonomers.

3. The process defined in claim 2 wherein the copolymer is an ethylene/vinyl trimethoxy silane copolymer.

4. The process defined in claim 1 wherein the copolymer is a silane grafted homopolymer or copolymer or a copolymer of an olefin and a silane.

5. A process according to claim 1 wherein said benzoic acid is employed in an amount of about 0.2% to about 3% by weight based on the weight of the solution.

6. A process according to claim 1 wherein said benzoic acid is employed in an amount of about 2.5% to about 2.8% by weight based on the weight of the solution.

7. A process according to claim 1 wherein said shaped article is submerged in said solution of benzoic acid.

8. A process according to claim 1 wherein said shaped article is sprayed with said solution of benzoic acid.

9. A process according to claim 1 wherein said shaped article is circulated through said benzoic acid solution.

10. A process according to claim 1 wherein said thermoforming operation is an extrusion operation.

11. A process according to claim 1 wherein said thermoforming operation is a molding operation.

12. A process according to claim I wherein said thermoplastic ethylene silane copolymer contains a mineral filler or carbon black.

* * * * *